US012676409B2

(12) United States Patent
Farsi et al.

(10) Patent No.: US 12,676,409 B2
(45) Date of Patent: Jul. 7, 2026

(54) INTEGRATED CIRCUIT AND SYSTEM WITH TRACKING

(71) Applicant: Qorvo Texas, LLC, Richardson, TX (US)

(72) Inventors: Saeed Farsi, San Diego, CA (US); Vipul Jain, Irvine, CA (US); Zarion Jacobs, San Diego, CA (US); Jonathan P. Comeau, San Diego, CA (US); Shmuel Ravid, San Diego, CA (US); Hakan Coskun, San Diego, CA (US)

(73) Assignee: Qorvo Texas, LLC, Richardson, TX (US)

( * ) Notice: Subject to any disclaimer, the term of this patent is extended or adjusted under 35 U.S.C. 154(b) by 455 days.

(21) Appl. No.: 18/144,047

(22) Filed: May 5, 2023

(65) Prior Publication Data

US 2024/0088555 A1      Mar. 14, 2024

Related U.S. Application Data

(63) Continuation of application No. 17/097,860, filed on Nov. 13, 2020, now abandoned.

(60) Provisional application No. 62/936,079, filed on Nov. 15, 2019.

(51) Int. Cl.
| | |
|---|---|
| *H01Q 3/26* | (2006.01) |
| *H01Q 3/28* | (2006.01) |
| *H01Q 3/38* | (2006.01) |
| *H04B 17/10* | (2015.01) |

(52) U.S. Cl.
CPC ............... *H01Q 3/267* (2013.01); *H01Q 3/28* (2013.01); *H01Q 3/385* (2013.01); *H04B 17/102* (2015.01)

(58) Field of Classification Search
None
See application file for complete search history.

(56) References Cited

U.S. PATENT DOCUMENTS

2020/0169332 A1* 5/2020 Tervo ..................... H04B 17/12

* cited by examiner

*Primary Examiner* — Whitney Moore
(74) *Attorney, Agent, or Firm* — Fish & Richardson P.C.

(57) ABSTRACT

A beamforming IC operates in a transmit mode or a receive mode to respectively transmit and receive signals at different times. To that end, the beamforming IC has an element interface, a transmit branch configured to produce an output transmit signal through the element interface when in the transmit mode, and a receive branch configured to receive an input signal through the element interface when in the receive mode. The beamforming circuit also has a sampling circuit with an electrical coupling with the transmit branch. The sampling circuit is configured to sample the output transmit signal with the electrical coupling to produce a sample signal. The sampling circuit also is configured to direct the sample signal through the receive branch, which is configured to modify the phase of the sample signal to produce a modified sample signal. This modified sample signal can be used to manage the IC transmission.

20 Claims, 9 Drawing Sheets

INTEGRATED CIRCUIT AND SYSTEM WITH TRACKING

PRIORITY

This patent application is a continuation of U.S. patent application Ser. No. 17/097,860, filed Nov. 13, 2020, entitled "INTEGRATED CIRCUIT AND SYSTEM WITH TRACKING," which claims priority from provisional U.S. patent application No. 62/936,079, filed Nov. 15, 2019, entitled, "BEAMFORMING INTEGRATED CIRCUIT WITH FEEDBACK TRACKING," each of which is hereby incorporated herein, in its entirety, by reference.

FIELD OF THE INVENTION

Illustrative embodiments of the invention relate to integrated circuits and systems implementing phased arrays and, more particularly, illustrative embodiments of the invention relate to tracking the output of certain phased arrays.

BACKGROUND

Active electronically steered/scanned antenna systems ("AESA systems," a type of "phased array system") or active antenna systems form electronically steerable beams for a wide variety of radar and communications systems. To that end, AESA systems typically have a plurality of beam-forming elements (e.g., antennas) that transmit and/or receive energy so that such energy can be coherently combined (i.e., in-phase and amplitude) in a specific direction. This process is referred to in the art as "beamforming" or "beam steering." Specifically, for transmission, many AESA systems implement beam steering by providing various RF phase shift and gain settings. The phase settings and gain weights together constitute a complex beam weight between each beam-forming element. For a signal receiving mode, many AESA systems use a beamforming or summation point.

To achieve beam-forming using an antenna array, each antenna element is connected to a semiconductor integrated circuit generally referred to as a "beam-forming IC." This microchip/integrated circuit may have a number of sub-circuit components implementing various functions. For example, those components may implement phase shifters, amplitude control modules or a variable gain amplifier (VGA), a power amplifier, a power combiner, a digital control, and other electronic functions. Such an integrated circuit is packaged to permit input and output radio frequency (RF) connections.

SUMMARY OF VARIOUS EMBODIMENTS

In accordance with one embodiment of the invention, an IC (e.g., a beamforming IC) operates in one of a transmit mode and a receive mode to respectively transmit and receive signals at different times. To that end, the IC has an element interface, a transmit branch configured to produce an output transmit signal through the element interface when in the transmit mode, and a receive branch configured to receive an input signal through the element interface when in the receive mode. The beamforming circuit also has a sampling circuit with an electrical coupling with the transmit branch. The sampling circuit is configured to sample the output transmit signal with the electrical coupling to produce a sample signal. The sampling circuit also is configured to direct the sample signal through the receive branch, which is configured to modify the phase of the sample signal to produce a modified sample signal. This modified sample signal can be used to manage the IC transmission.

The electrical coupling preferably is formed from a passive circuit element. To that end, the electrical coupling may be configured to passively sample with the passive circuit element. To produce the modified sample signal, the receive branch may have a receive phase shifter while the transmit branch has a transmit phase shifter. The receive phase shifter and transmit phase shifter may be configured to have substantially opposite polarities when in the transmit mode. The IC also may have a summing node configured to electrically combine a plurality of modified sample signals from a plurality of different receive branches in the IC.

Among other things, the IC may have a second feedback structure for monitoring transmission from a second element interface of the beamforming interface. In that case, the IC may have a second transmit branch configured to produce a second output transmit signal through the second element interface when in the transmit mode, and a second receive branch configured to receive input signals through the second element interface when in the receive mode. The IC also may have a second sampling circuit with second sample output and a second electrical coupling with the second transmit branch. The second sampling circuit is configured to sample the second output transmit signal with the second electrical coupling to produce a second sample signal. In addition, the second sampling circuit may be configured to direct the second sample signal through the second receive branch to the second sample output to produce a second modified sample signal. To control the IC better, the IC also may have a sample controller configured to selectively enable the IC to either 1) produce the modified sample signal at the sample output or 2) produce the second modified sample signal at the second sample output. In fact, the sample controller also may be configured to selectively enable the IC to produce both the modified sample signal and the second modified sample signal at the sample output.

Like other branches, the receive branch may have a receive output configured to forward signals off the IC. To avoid cross-talk or other interference, the sampling circuit may have a corresponding sample output that is electrically isolated from the receive output. The receive branch also may have a receive amplifier and a receive phase shifter. To obtain a more accurate sample, the IC may be configured to cause the sample signal to bypass the receive amplifier when in the transmit mode. Despite that configuration, the receive phase shifter, however, may be configured to receive the sample signal when in the transmit mode. For similar reasons, the sampling circuit may be configured to be electrically isolated from the receive branch when in the receive mode. In addition, the sampling circuit may be configured to sample the output transmit signal downstream of the transmit amplifier.

In accordance with another embodiment, a beamforming system has a phase shifter, a plurality of elements, and beamforming IC coupled with the plurality of elements. The beamforming IC has a transmit branch configured to produce an output transmit signal when in a transmit mode. The beamforming IC further includes a sampling circuit having an electrical coupling with the transmit branch. The sampling circuit is configured to sample the output transmit signal with the electrical coupling to produce a sample signal. The sampling circuit also is configured to direct the sample signal through the phase shifter to produce a modified sample signal. In addition, the system further has a substrate supporting the beamforming IC and a plurality of elements coupled with the beamforming IC.

In accordance with other embodiments, beamforming method provides a beamforming IC having a transmit branch configured to produce an output transmit signal when in a transmit mode and a receive branch configured to receive an input signal when in a receive mode and having a receive interface. The method then electrically couples with the transmit branch when in the transmit mode to produce a sample signal, and directs the sample signal through the receive branch to modify the phase of the sample signal, producing a modified sample signal. Next, the method forwards the modified sample signal from the receive interface.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments enable far field signal monitoring locally; i.e., near or at the beamforming integrated circuit ("BFIC") transmitting the output signal toward a device in the far field. To that end, the noted BFIC has a plurality of transmit branches that each are configured to produce a local copy of its specified output signal. Each local copy then is phase shifted in a precise manner so that, when combined with the local copies of other transmit branches of the BFIC, forms a single output signal copy that mimics the actual output signal of the entire BFIC. The system may use this single output signal copy for a number of beamforming system functions, such as for monitoring power, calibration, minimizing output signal distortion, etc. Details of illustrative embodiments are discussed below.

Figure 1:
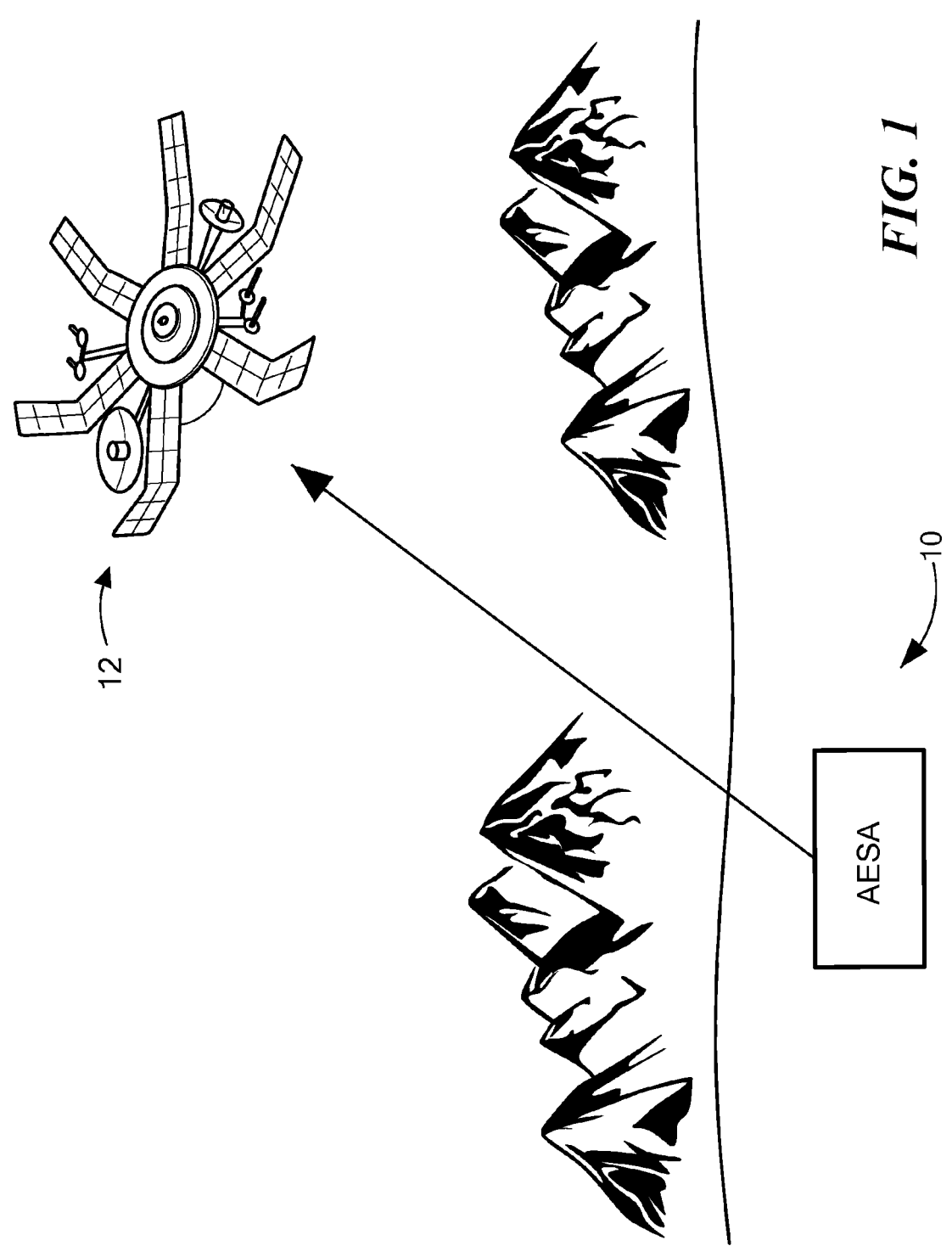
FIG. 1 schematically shows an active electronically steered element system ("AESA system") configured in accordance with illustrative embodiments of the invention and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array forms one or more of a plurality of electronically steerable beams that can be used for a wide variety of applications. As a satellite communication system, for example, the AESA system preferably is configured to operate at one or more satellite frequencies. Among others, those frequencies may include the Ka-band, Ku-band, and/or X-band.

The satellite communication system may be part of a cellular network operating under a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
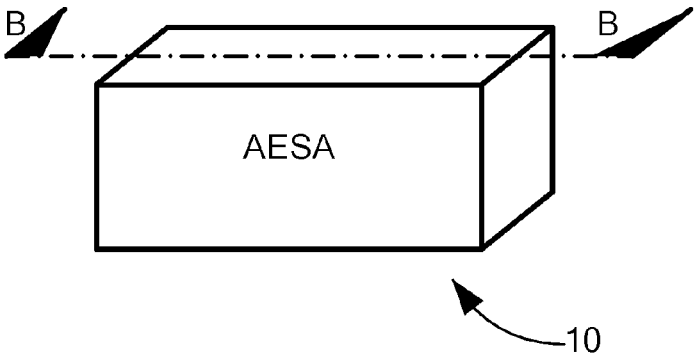
FIGS. 2A and 2B schematically show generalized diagrams of an AESA system that may be configured in accordance with illustrative embodiments of the invention.
Figure 2B:
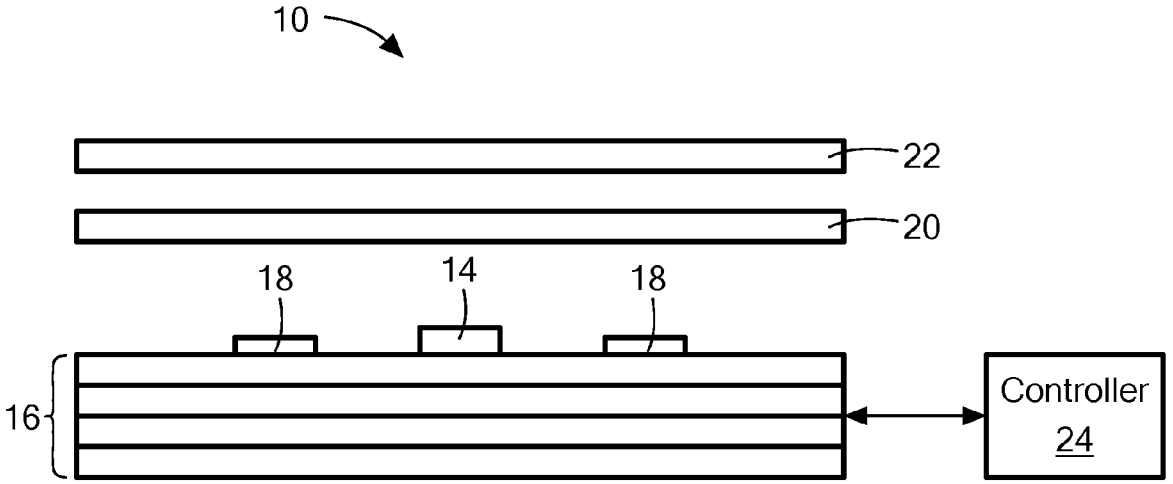

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 mounted onto a substrate 16 between two transmit, receive, and/or dual transmit/receive elements 18, i.e., on the same side of a supporting substrate 16 and juxtaposed with the two elements 18. Note that in some embodiments, such as some implementing cellular communications, the integrated circuit 14 can be coupled with four elements 18. In alternative embodiments, however, the integrated circuit 14 could be on the other side/surface of the substrate 16. The AESA system 10 also has a radome 22 to environmentally protect the phased array of the system 10. A separate antenna controller 24 (FIG. 2B) electrically connects with the phased array to calculate beam steering vectors for the overall phased array, and to provide other control functions.

Figure 3A:
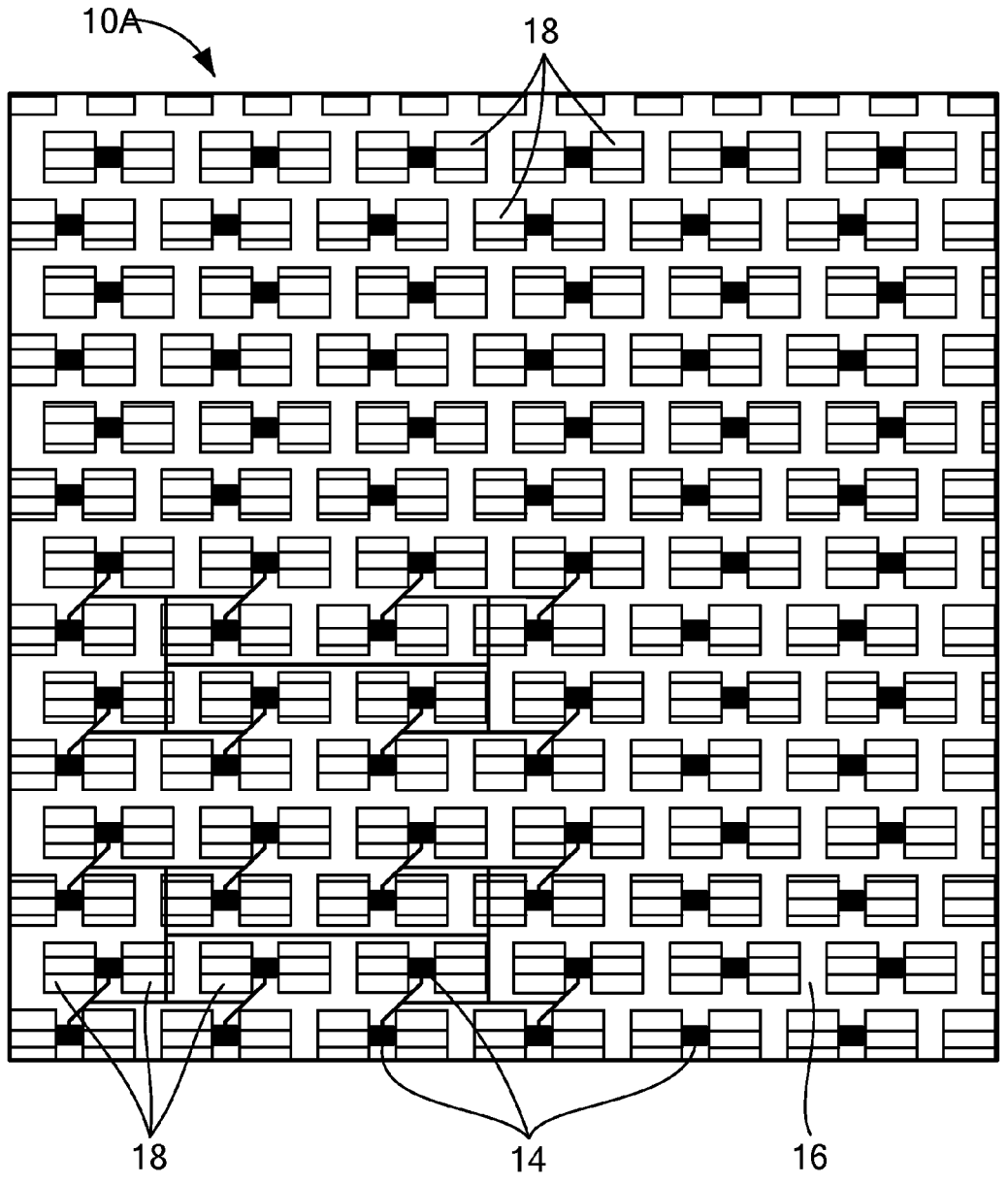
FIG. 3A schematically shows a plan view of a laminar printed circuit board portion of an AESA configured in accordance with illustrative embodiments of the invention.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16, such as an FR-4 printed circuit board (i.e., acting as the substrate for routing signals and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration.

Like other similar phased arrays, the printed circuit board 16 also may have a ground plane (not shown) that electrically and magnetically cooperates with the elements 18 to facilitate operation.

Figure 3B:
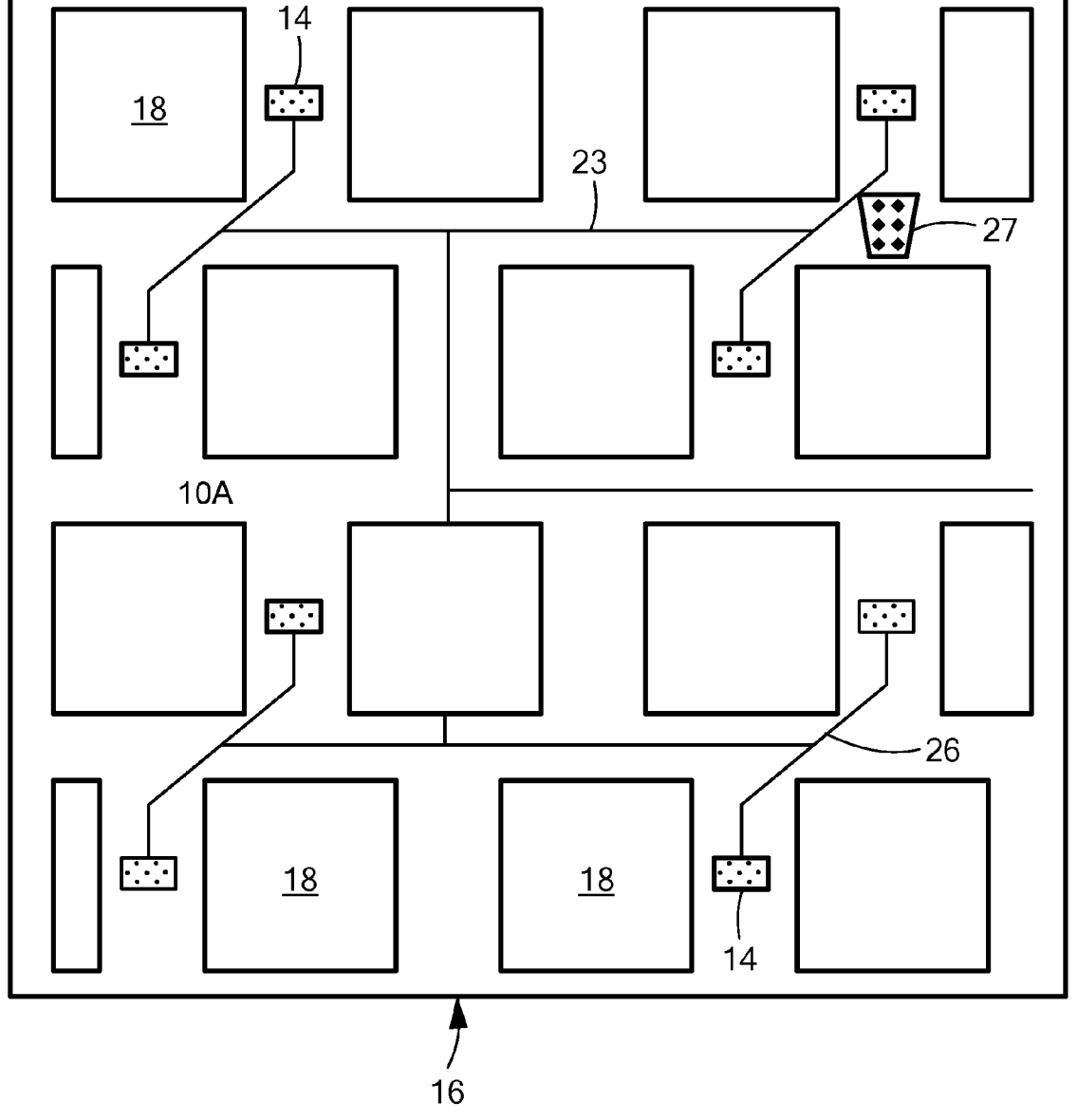
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18 or the transmission/receiving part of the element) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field and/or receive RF signals.

As noted above and discussed in greater detail below, illustrative embodiments form the patch antennas on one or more printed circuit boards that themselves are coupled with the printed circuit board 16. These patent antennas preferably are formed using standard printed circuit board fabrication processes, thus complying with standard printed circuit board design rules (discussed below). Accordingly, using such fabrication processes, each element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24 at least in part controls the mode and operation of the phased array 10A, as well as other array functions.

The AESA system 10 has a plurality of the above noted integrated circuits 14 (mentioned above with regard to FIG. 2B) for controlling operation of the elements 18. As noted above, those skilled in the art often refer to these integrated circuits 14 as "beam steering integrated circuits," or "beam forming integrated circuits" ("BFICs 14").

Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:

phase shifting, amplitude controlling/beam weighting, switching between transmit mode and receive mode, output amplification to amplify output signals to the elements 18, input amplification for received RF signals (e.g., signals received from the satellite 12), and power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches.

Each BFIC 14 preferably operates on at least one element 18 in the array. For example, one BFIC 14 can operate on two or four different elements 18. Of course, those skilled in the art can adjust the number of elements 18 sharing an BFIC 14 based upon the application. For example, a single BFIC 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly sometimes enabling a reduction in the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the BFIC 14. Instead, such embodiments may duplex at the element 18. This process can be performed by isolating one of the elements 18 between transmit and receive by an orthogonal feed connection.

RF interconnect, through-vias, and/or beam forming lines 23 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each BFIC 14 preferably is packaged either in a flip-chipped configuration using wafer level chip scale packaging (WLCSP), or a traditional package, such as quad flat no-leads package (QFN package). While other types of packaging may suffice, WLCSP techniques are preferred to minimize real estate on the substrate 16A. Some embodiments may mount some or all of the integrated circuits 14 on or within the printed circuit boards 16 supporting the elements 18. Other embodiments may mount some or all of the integrated circuits 14 on the underlying routing of the printed circuit board 16.

In addition to reducing feed loss, using WLCSP techniques reduces the overall footprint of the integrated circuits 14, enabling them to be mounted on the top face of the printed circuit board 16 with the elements 18—providing more surface area for the elements 18.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each BFIC 14 can connect to more or fewer elements 18, or the lattice configuration can be different. Accordingly, discussion of the specific configuration of the AESA system 10 of FIG. 3A (and other figures) is for convenience only and not intended to limit all embodiments.

As noted above, illustrative BFICs 14 more effectively monitor their output transmit signals. In some embodiments, those BFICs 14 monitor dual/mode elements 18 although, in some embodiment, the BFICs 14 may monitor transmit-only elements 18. Accordingly, each BFIC 14 with this functionality has a sampling device that, when in the transmit mode, forms one or more samples of the output transmit signal and feeds the sampled transmit signal back into its temporarily non-used circuit component(s) (e.g., one of its receive branches 46) for processing. In this case, the BFIC 14 therefore efficiently makes use of unused receive branch 46 during the transmit mode to monitor the transmit signal without requiring significant additional circuit components. In other embodiments, rather than using one of the receive branches 46 or any of its unused circuitry, the BFIC 14 uses additional components (e.g., additional components) to accomplish the desired function (discussed below).

Figure 4:
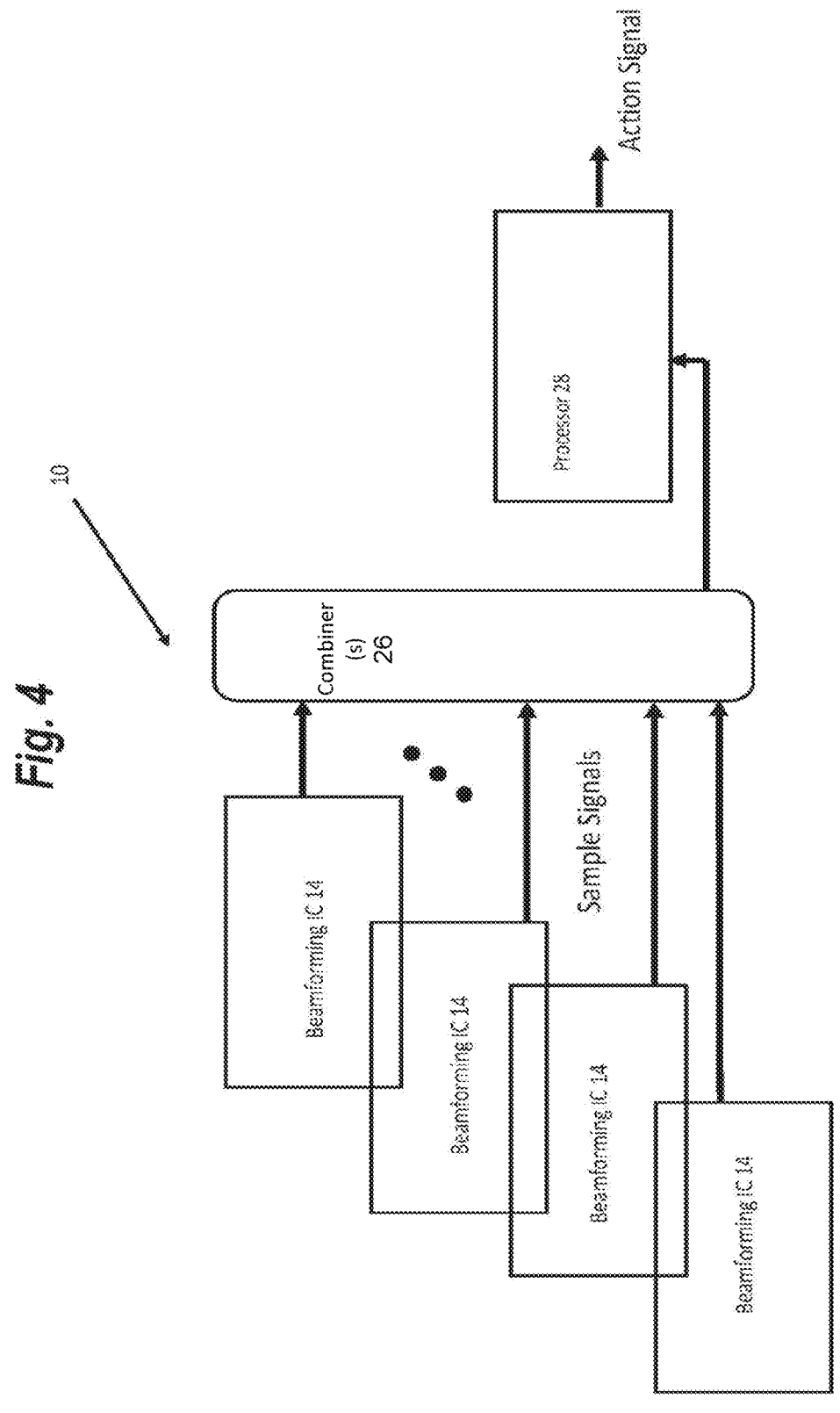
FIG. 4 schematically shows a beamforming system that may implement illustrative embodiments of the invention.

To those ends, FIG. 4 schematically shows the beamforming or AESA system 10 configured in accordance with illustrative embodiments of the invention. Specifically, the system 10 shown has a plurality of BFICs 14 that each produce a "sample signal." In preferred embodiments, the BFICs 14 produced their sample signals so they may be relatively easily combinable on some off-chip combiner 26 on the printed circuit board 16. Preferably, the plurality of sample signals are in phase (e.g., at zero or 360 degrees) to facilitate their combination. Other embodiments, however, may use combining logic to combine the sample signals when they are not in-phase.

For a given BFIC 14 or for the system 10 as a whole, the "sample signal" may be an attenuated version or attenuated portion of the output transmit signal. Alternatively, the sample signal may be another signal similar to, or even the same as, the output transmit signal. In either case, the sample signal is formed as a function of the output transmit signal and thus, can be used to understand characteristics of the output transmit signal (e.g., the level of distortion). The term "sample" therefore is not intended to suggest that it digitally samples the signal, although some embodiments may employ digital sampling while monitoring that output signal during BFIC transmission toward the far field. Accordingly, for each BFIC 14, the sample signal is a signal that mimics and/or is formed as a function of the actual transmitted signal. Logic can convert this sample signal, if necessary, to an appropriate form for further processing.

FIG. 4 also shows a combiner 26 that forms a system-level sample signal (contrasted against a die-level sample signal produced by each BFIC 14) that may be processed by a downstream processor 28. Among other things, the combiner 26 may be implemented in one or more layers of the printed circuit board 16 to form an effective, lossy summation node. For example, this node may act as an effective Wilkinson power combiner circuit. Accordingly, in a manner similar to each die-level sample signals, the system-level sample signal preferably is formed to have a single frequency and phase. As another example, the combiner 26 may include logic that combines the signals in a conventional manner into the single system-level signal. In some embodiments, the combiner 26 can be fully on-chip (i.e., on the BFIC 14), fully on the substrate/printed circuit board 16, or distributed across the BFIC 14

The downstream processor 28 may perform a number of functions, discussed below. In this example, the processor 28 includes a down-converter to reduce the frequency of the system-level sample signal for yet further processing with one or more other processors 28. The processor 28 may be on the printed circuit board 16, or on an off-board system. Moreover, the processor 28 may include a wide variety of other devices. One skilled in the art can select the appropriate processor 28 for a desired application. For example, as known by those in the art, a AESA system 10 undesirably may distort an intended signal. To ensure the output transit signal is transmitted as desired, those skilled in the art thus may pre-distort the input transmit signal (e.g., using "digital pre-distortion", or "DPD" techniques) in an opposite manner to a known transmit distortion, thus canceling out the distortion. Of course, the processor 28 uses information from the sample signal to appropriately pre-distort the output transmit signal.

Accordingly, off-chip circuitry may use the system-level sample signal (or one or more specific die-level sample signals) to reconstruct and/or learn about the actual characteristics of the relevant transmit signal. Using this information, some embodiments may compare this sample signal with the desired output transmit signal for applying appropriate DPD techniques to the input transmit signal (on the system level and/or on the die level) before it is processed on the integrated circuit 14. To that end, the processor 28 may have a DPD block in the system's digital modem to pre-distort the input signal as a function of the relevant sample signal. This pre-distortion may be adjusted in real-time (i.e., during use) and/or set during a calibration step.

Instead of or in addition to the DPD block, the downstream processor 28 be implemented as a power monitor to monitor output transmit power in one or more arrays or one or more BFICs 14 (e.g., monitoring EIRP). In addition, the downstream processor 28 may monitor the BFICs 14 individually for maintaining the general working and health of the AESA system 10.

Figure 5A:
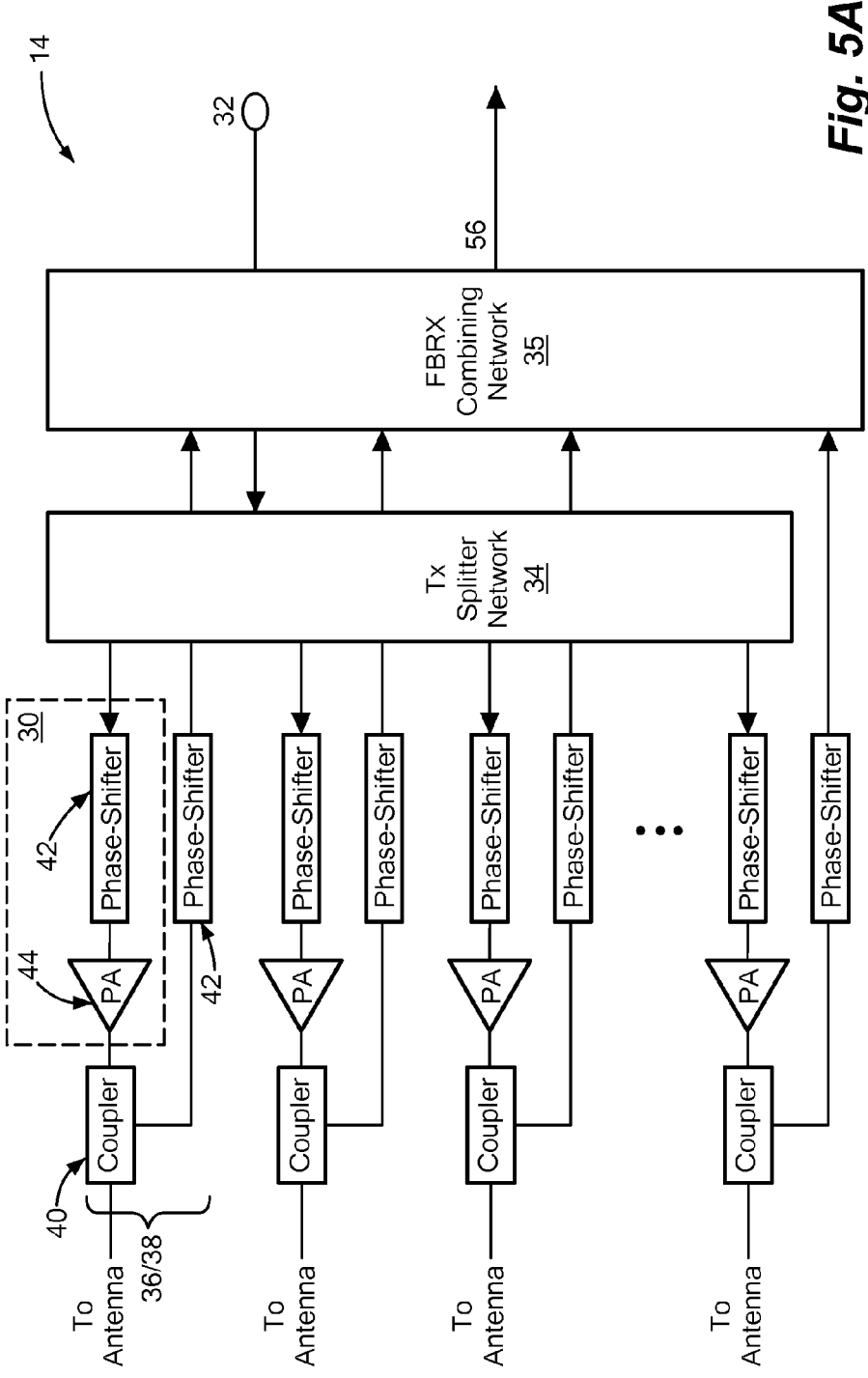
FIGS. 5A-5C schematically show increasing details of a beamforming integrated circuit that may implement illustrative embodiments of the invention.
Figure 5B:
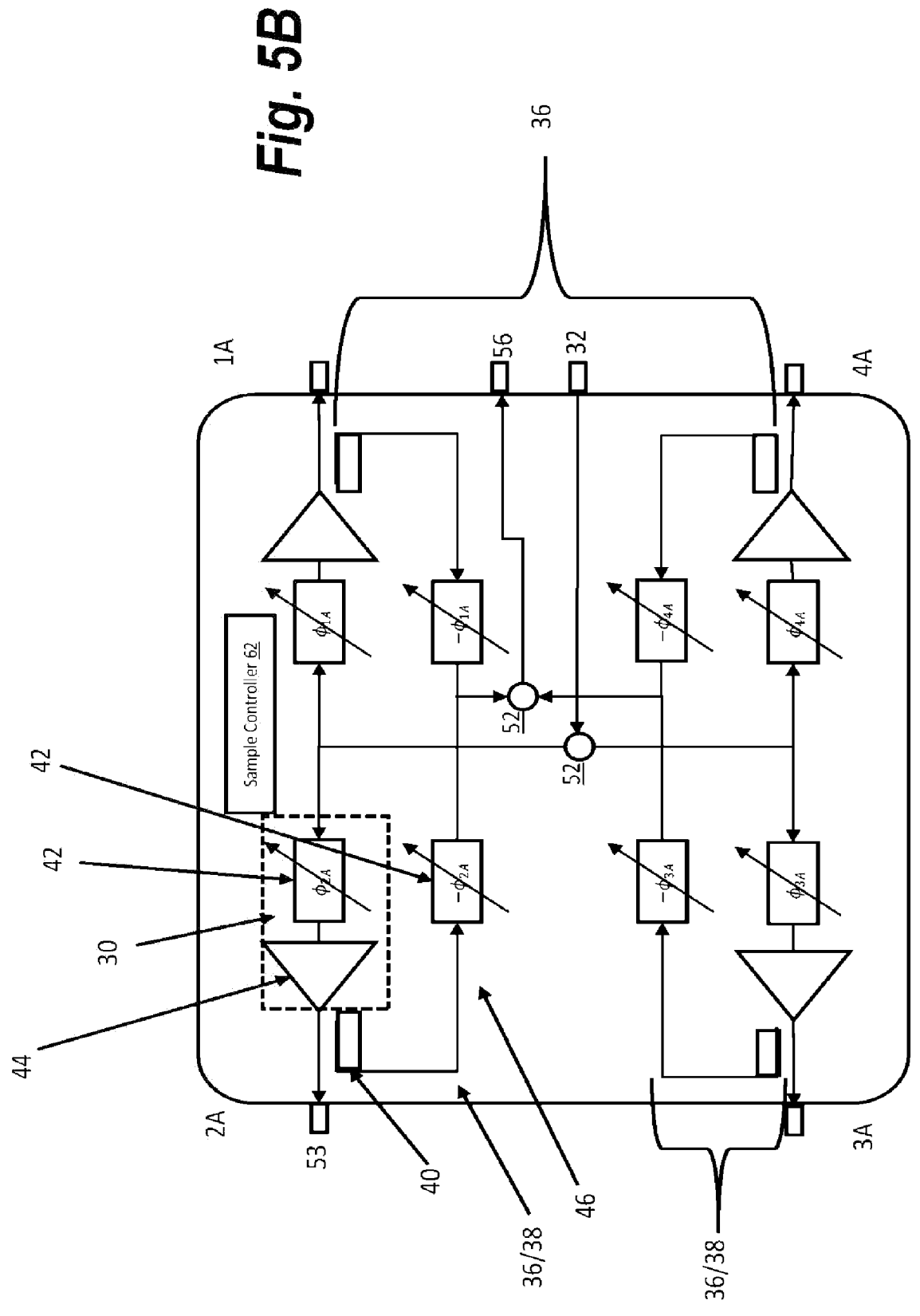
Figure 5C:
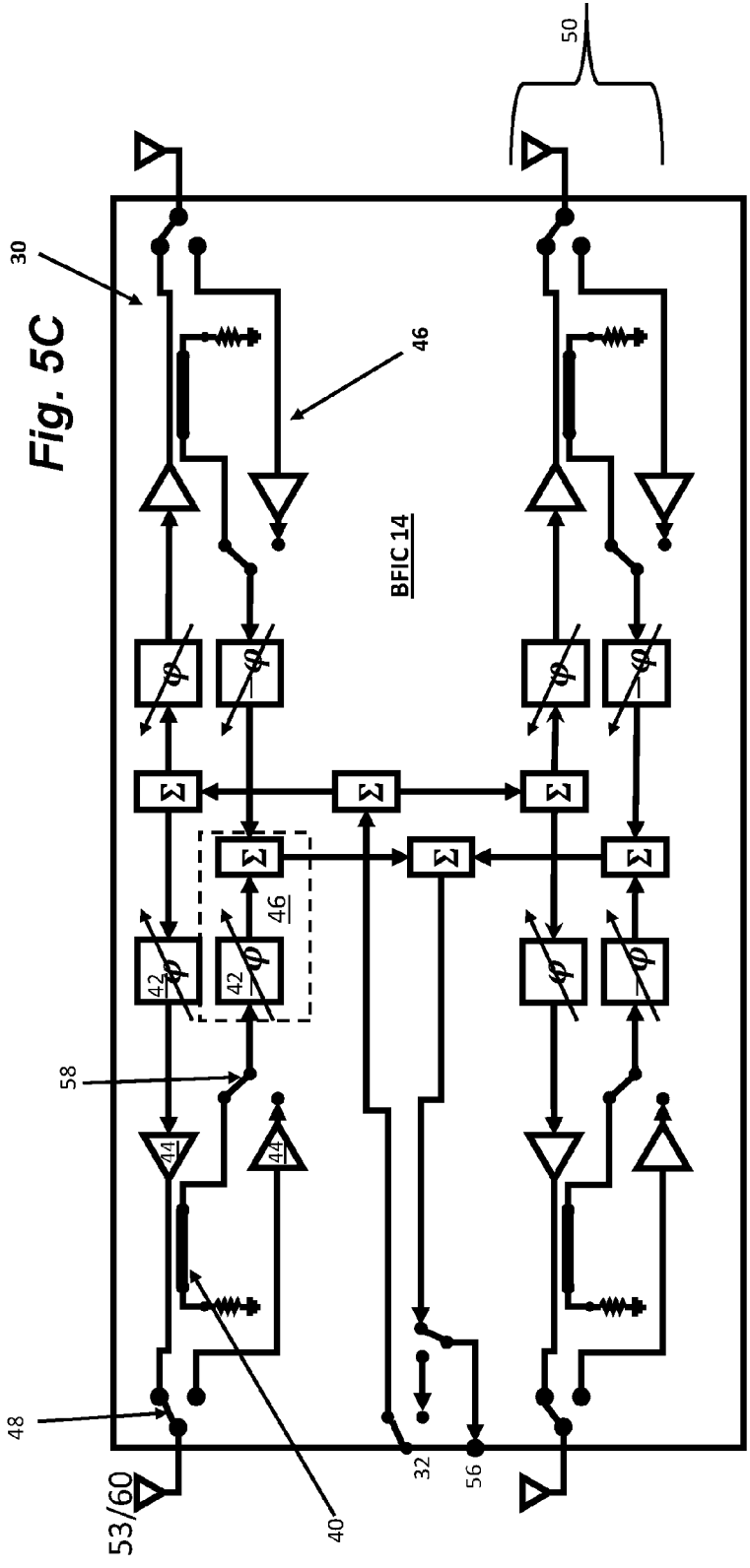

FIGS. 5A-5C schematically show increasing details of one of the BFICs 14 implemented in accordance with illustrative embodiments of the invention. It should be noted that in view of the symmetry of the various circuits and to make the figures more readable, FIGS. 5A-5C do not add reference numbers to all transmit branches and their related components. Instead, only one branch is labeled, but those skilled in the art should recognize that similarly positioned and identified blocks in other portions of the drawing has the same reference number.

Specifically, FIG. 5A shows a simple block diagram of a plurality of transmit branches 30 of a BFIC 14 that produces an output transmit signal to a remote device, such as the satellite 12 of FIG. 1. To that end, this figure shows a transmit signal input 32 of the BFIC 14 to a conventional transmit splitter network 34. As known by those in the art, the transmit splitter network 34 splits the input transmit signal into a plurality of signals that each are directed to at least one transmit branch 30. As discussed below, each transmit branch 30 phase shifts and amplifies its signal for transmission.

In accordance with illustrative embodiments, the BFIC 14 also has a sampling circuit 36 configured to produce a modified version of the output transmit signal. To that end, the sampling circuit 36 has a plurality of sampling sub-circuits 38 in electrical communication with each of the transmit branches 30. By way of example, these figures explicitly show four sampling sub-circuits 38 that together make up the sampling circuit 36. Each sampling sub-circuit 38 has an electrical coupler 40 configured to electrically couple to a node or circuit component in the transmit branch 30. Preferably, the electrical coupler 40 is near the end of the transmit branch 30, downstream of most active circuit components, such as the transmit branch phase shifter 42 and amplifier 44 (discussed below). In illustrative embodiments, that electrical coupler 40 is configured to capture a version of the transmit signal to be transmitted from that branch to the far field—that version is referred to above as the "sample signal." Those skilled in the art can select an appropriate electronic coupler to produce the sample signal.

Preferably, the electrical coupler 40 does not non-negligibly interfere or otherwise distort the actual output transmit signal. To that end, the electrical coupler 40 may be formed exclusively from passive components (i.e., one or more of capacitance, resistive, and inductive components). Alternatively, the electrical coupler 40 may have both passive and/or active components, although those in the art should strive to develop the electrical coupler 40 with an acceptably low or minimal interference to the output transmit signal in either implementation.

The sampling circuit 36 also has a phase shifter 42 to shift the sampled circuit, and passes that shifted signal back to a combining network 35 that combines the sample signals of all the transmit branches 30 to form the single (die-level) output sample signal. It is that output sample signal that those skilled in the art may use to better control transmission in the far field. FIG. 5B schematically shows more details of one embodiment of this general implementation of the four transmit branches 30 and four corresponding sampling sub-circuits 38. In that figure, the circles act as summing nodes 52 (e.g., using Wilkinson combiner circuits) to implement the functionality of the combining network 35 block of FIG. 5A. The output transmit signal is transmitted via transmit output 53 to the relevant transmit or dual receive/transmit element 18.

It should be noted that in FIG. 5A, arrows from the transmit signal input 32 do not pass through the combining network 35 (i.e., the combining network 35 does not receive those signals) and, instead, pass to an input of the transmit splitter network 34. In a similar manner, arrows from the sampling circuit 36 (i.e., the phase shifters 42 of the sampling circuit 36) do not pass through the transmit splitter network 34 (i.e., the transmit splitter network 34 does not receive those signals) and, instead, pass to an input of the feedback combining network 35. The arrows are drawn this way to simplify the size and complexity of the drawing.

The sampling circuit 36 and other discussed components in FIG. 5A can be on the same die as the BFIC 14, or spread across multiple dies. In a similar manner, some of the transit branches 30 may not have a corresponding sampling sub-circuit 38 and thus, cannot be managed in a manner similar to the transmit branches 30 having a corresponding sampling sub-circuit 38. Those skilled in the art can select the appropriate implementation as a function of the intended application.

Preferred embodiments do not require extra circuit components to implement some or all of the sampling circuit 36. Specifically, there is a drive in the art to reduce cost and size of beamforming ICs. The inventors recognized this and, after experimentation, recognized that the receive branches

46 of the BFICs 14 are not used during the transmit mode. To mitigate size, the inventors discovered that they could re-use the receive branches 46 during their "down time" to assist with transmit output signal management. The inventors then realized that with some careful configuration, they could use the phase shifter 42 and summing nodes (identified by a sigma symbol in the figures) of the receive branches 46 to produce their sample signals without significantly extra circuitry.

FIG. 5C schematically show more details of this reuse of the receive branch circuitry. More specifically, to implement its core functionality, the BFIC 14 in this figure has four transmit branches 30 for transmitting signals, and four parallel receive branches 46 for receiving signals. This implementation correspondingly has four transmit/receive switches ("T/R switches 48") to alternatively couple one transmit branch 30 or one receive branch 46 with respective element interfaces 53/60. In other words, this integrated circuit 14 may be considered to have four transmit and receive branch pairs ("branch pairs 50"), and each branch pair 50 forms one of the channels. Each branch pair 50 thus has a single transmit branch 30 and a single receive branch 46. The noted T/R switch 48 thus couples the transmit branch 30 to its respective element interface 60 when in the transmit mode and, correspondingly, couples the receive branch 46 to that same element interface 60 when in the receive mode. Each element interface 60 couples with at least one element 18 of the larger AESA system 10.

Instead of using a T/R switch 48, however, some embodiments may use opposite polarity signals for receive and transmission of signals. For example, the signals' spatial directions may be ninety degrees out of phase with each other. Accordingly, such embodiments electrically couple the element interface 53/60 with both the transmit and receive branches 30 and 46, thus omitting the noted T/R switch 48.

Each branch has its conventional components discussed above, and some of those components are shown in FIG. 5C. Among other things, those components include amplifiers 44, phase shifters 42, summing nodes 52, and/or splitting nodes 54. Signals enter and leave the BFIC 14 via a series of interfaces 53/60. FIG. 5C identifies some of those interfaces schematically in the transmit/receive pair in the lower left corner of the circuit. In accordance with illustrative embodiments, each pair of transmit/receive branches 30/46 includes the above discussed sampling sub-circuit 38 (i.e., at least partly implemented by the respective receive branches) to monitor the output signal of its transmit branch 30 when in the transmit mode. In this figure, the sampling circuit 36 includes the electrical coupler 40, such as a wire (with a terminating resistor) that inductively or parasitically couples with part of the transmission line (e.g., adjacent to the beamforming line 23) of the transmit branch 30. Preferably, as noted above, the electrical coupler 40 is physically positioned between the last active electronic device (an amplifier 44 in this case) and the element interface 53/60. In other words, the electrical coupler 40 is "downstream" of the amplifier 44 in this case because it receives a signal from the amplifier 44.

As noted above, rather than using an inductive, non-contact device, the sampling sub-circuits 38 may include a conductive circuit that directly receives at least a portion of the output signal. Appropriate signaling and circuitry (e.g., a small voltage divider circuit) may be used to produce a corresponding result. Accordingly, those in the art may use other types of sampling circuits 36 than those discussed. In this and other embodiments, the sampling circuit 36 is configured so that it does not appreciably attenuate or otherwise distort the output transmit signal.

To use the sampling circuit 36, the integrated circuit 14 also has a sample switch 58 (e.g., a single pole, double throw switch) to switchably connect the sampling sub-circuit 38 with the receive branch 46 when in the transmit mode. This switchable connection may be considered to be a feedback connection to monitor the output transmit signal. Moreover, in preferred embodiments, the sampling switch 58 couples at or after the output of the amplifier 44 (e.g., a low noise amplifier) in its respective receive branch 46. By doing this, the integrated circuit 14 effectively bypasses that low noise amplifier 44, mitigating potential distortion to the sample signal that such amplifier 44 undesirably may produce, as well as avoiding significant noise figure degradation of the receiver due to sampling switch loss in the receive mode.

Accordingly, during the transmit mode, the sampling circuit 36 generates and transits the sample signal through the (formerly dormant) receive branch 46 and sums the various sampling signals at various signal summing nodes 52 in the integrated circuit 14. To ensure that the phase shifters 42 do not cancel each other out in this multi-channel implementation, illustrative embodiments change the insertion phase of the phase shifters 42 in the receive branch 46 (when in the transmit mode) to be opposite of the respective insertion phases of their transmit branches 30. This ensures that the samples from different branches combine in phase (e.g., null or max phase), and also ensures they obtain a high similarity of the combined sample to the actual radiated signal. As such, when in the transmit mode, the sample signal of each branch pair 50 passes through the various receive branches 46, combine at various summing nodes 52, and are transmitted from the integrated circuit 14 at a sample output interface 56. This sample output interface 56 may be a dedicated interface to the feedback/sample signal, or it may share an interface with other functions of the BFIC 14.

FIG. 5B schematically shows the phase shifters 42 of each transmit branch 30 and sampling sub-circuit 38. Traversing counter-clockwise starting at the top right, the various transmit branches 30 are labeled 1A, 2A, 3A, and 4A. Each transmit branch 30 in this example has a transmit branch phase shifter 42 and a sampling sub-circuit phase shifter 42 (note that the sampling sub-circuit phase shifter 42 can be a shared component with the receive branch 46). Using the branches labeled as "1A,", the transmit branch phase shifter 42 has a phase phi 1A, while the corresponding sampling sub-circuit phase shifter 42 has an opposite phase of negative phi 1A. This makes the phase a null phase. The other transmit branches 2A, 3A, and 4A have similar phase shifting relationships. Accordingly, in this example, the output sample signal will have a null phase as it is combined from the four in-phase signals for the transmit branches 1A-4A. Those skilled in the art, however, may have different phase shifting relationships and corresponding logic to still produce the output sample signal. Various embodiments therefore are not limited to producing the canceling phase shifts for a null phase.

When the integrated circuit 14 transitions to the receive mode, the T/R switch 48 and the sampling switch 58 both switch to their second, opposite positions. As such, this connects the receive branches 46 to the element interface 60 and disconnects the sampling circuit 36 from the receive branch 46. Accordingly, the sampling circuit 36 is electrically unconnected to either the transmit or receive branches 30 and 46—effectively in an open circuit state. In other words, when in the receive mode, the sampling circuit 36 is electrically isolated in the integrated circuit 14. In a corresponding manner, when in the transmit mode, the sampling circuit 36 is electrically coupled with the transmit branches 30. In preferred embodiments, the sampling circuit output 56 is electrically isolated from the output of the receive branches 46—the sampling circuit 36 may have its own interface pin on the BFIC 14. In other embodiments, however, they may share an output interface.

As suggested above, illustrative embodiments may monitor the output transmit signal of all of the transmit branches 30 of a single BFIC 14, or the transmit signal for a sub-set of the transmit branches 30 of one or more BFICs 14. To that end, as shown in FIG. 5B, the BFIC 14 also may have a sample controller 62 configured to selectively control switching in a manner that selectively monitors specific transmit branches 30. Accordingly, for a four branch BFIC 14, the switching controller may monitor one, two, three, or all four transmit branches 30. This selective monitoring can be coordinated across the plurality of BFICs 14 of a single AESA system 10 to produce fine-tuned monitoring and management of specific transmit branches of various BFICs 14 across the entire AESA system 10.

It should be reiterated that various embodiments can expand beyond that shown. For example, the figures show just one polarization for simplicity. Those skilled in the art may use dual-polarity circuitry and multiple sample output interfaces 56 for a given transmit branch 30 or BFIC 14, as well as multiple transmit/receive signal interfaces.

Figure 6:
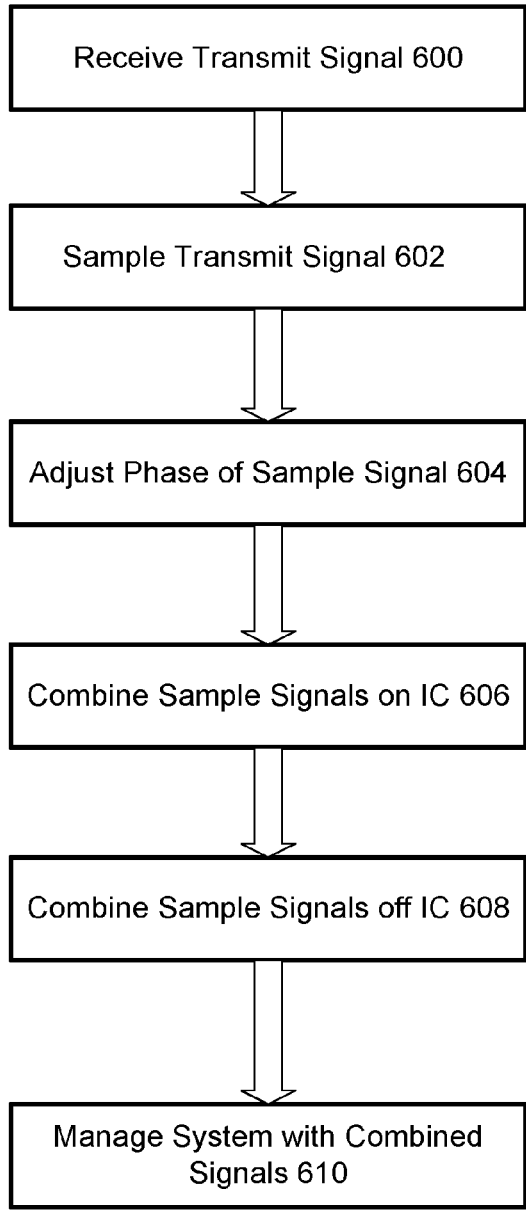
FIG. 6 shows a beamforming process in accordance with illustrative embodiments of the invention.

FIG. 6 shows a beamforming process in accordance with illustrative embodiments of the invention. It should be noted that this process is substantially simplified from a longer process that normally would be used to produce a beamformed signal. Accordingly, the process typically has many that those skilled in the art likely would use. In addition, some of the steps may be performed in a different order than that shown, or at the same time. Those skilled in the art therefore can modify the process as appropriate. Moreover, as noted above and below, many of the devices used to implement the process (e.g., those discussed with regard to FIGS. 5A-5C) are exemplary of a wide variety of different devices that may be used. Those skilled in the art can select the appropriate devices depending upon the application and other constraints. Accordingly, discussion of specific devices is not intended to limit all embodiments.

The process begins at step 600, in which the transmit input 32 (FIGS. 5B and 5C) receives the signal to be transmitted. That signal in turn is passed through the transmit splitter network 34 of FIG. 5A, which, as shown in FIGS. 5B and 5C, includes a series of splitters that may be implemented as Wilkinson Splitters or similar devices. After the split, the resultant transmit signals of each branch pass through respective phase shifters 42 and amplifiers 44, and ultimately pass through the transmit output or other transmission interface 53 (shown schematically in FIG. 5B). The output transmit signal of each branch ultimately produces the final output transmit signal from the array via a corresponding element 18 (e.g., a transmit element 18 or a dual transmit/receive element 18). At this point, the BFIC 14 is producing a plurality of to-be-combined (using beamforming processes) transmit signals via each of its branches.

Next, using appropriate switching at step 602, the sampling circuit 36 begins sampling the transmit signal to produce a local, "mimicked" version of the transmit signal for each branch. Each branch then forwards its local sample signal into its corresponding receive branch 46 for modification. To that end, the receive branches 46 adjust the phase of their sample signals at step 604 to produce an appropriately phased signal that can be combined with other sample signals, and combines the various branch modified sample signals using the noted combining network 35 (step 606).

At this point in the process, the BFIC 14 has a single sample signal to forward off-chip toward the system-level combining node/device, which, as noted above, preferably is a node in the substrate/printed circuit board 16 (step 608). The process concludes at step 610, in which the process manages the system with the combined sample signal. Among other things and as noted above, this combined sample signal enables the system 10 to detect output transmit signal distortions, thus permitting the system 10 to pre-distort the input transmit signal to compensate for such discovered distortion. As such, the ultimate signal transmitted may be closer to the idealized output transmit signal. This process preferably is performed in real-time, during use.

Accordingly, illustrative embodiments enable local far-field transmit signal monitoring. Such processes may efficiently reuse temporarily dormant circuitry already on the BFIC 14 to effectively monitor far-field transmit signals.

The embodiments of the invention described above are intended to be merely exemplary; numerous variations and modifications will be apparent to those skilled in the art, such as applications to other types of integrated circuits beyond BFICs 14. Such variations and modifications are intended to be within the scope of the present invention as defined by any of the appended claims. Some embodiments contemplate applying various combinations of the claims together.

What is claimed is:

1. An integrated circuit (IC) that enables local monitoring of far field output transmit signals, the IC having a transmit mode in which the IC is actively transmitting to the far field and is not actively processing receive signals from the far field and a receive mode in which the IC is actively processing receive signals from the far field, the IC comprising:

a plurality of transmit/receive channels, each transmit/receive channel comprising a transmit branch configured to produce an output transmit signal for far field transmission when in the transmit mode, a sampling circuit configured to sample the output transmit signal to produce a distinct sample signal, and a receive branch configured (a) to receive a far field input signal when in the receive mode and (b) to receive the distinct sample signal and modify the phase of the distinct sample signal to produce a distinct modified sample signal when in the transmit mode;

a summing system that combines a plurality of the distinct modified sample signals from the receive branches into a combined output signal copy that mimics an actual far field transmit output signal of the IC; and a sample controller configured to control which of the plurality of transmit/receive channels are combined to form the combined output signal copy.

2. The IC as defined by claim 1, wherein the sampling circuit comprises an electrical coupling having a passive circuit element, and wherein the electrical coupling is configured to passively sample the output transmit signal with the passive circuit element.

3. The IC as defined by claim 1, wherein the receive branch has a receive phase shifter and the transmit branch has a transmit phase shifter, and wherein the receive phase shifter and the transmit phase shifter are configured to have opposite polarities when in the transmit mode.

4. The IC as defined by claim 1, further comprising a processor configured to process the combined output signal copy.

5. The IC as defined by claim 4, wherein the processor is configured to adjust at least one IC function based on the processing of the combined output signal copy.

6. The IC as defined by claim 1, further comprising a digital pre-distorter configured to receive a modified sample signal associated with a given transmit branch and to pre-distort the output transmit signal of the given transmit branch as a function of the received modified sample signal.

7. A beamforming system that enables local monitoring of far field output transmit signals, the beamforming system comprising:

a plurality of elements for transmission and reception of far field signals;

at least one IC having a transmit mode in which the IC is actively transmitting to the far field and is not actively processing receive signals from the far field and a receive mode in which the IC is actively processing receive signals from the far field, the IC comprising a plurality of transmit/receive channels, each transmit/receive channel comprising a transmit branch configured to produce an output transmit signal for far field transmission when in the transmit mode, a sampling circuit configured to sample the output transmit signal to produce a distinct sample signal, and a receive branch configured (a) to receive a far field input signal when in the receive mode and (b) to receive the distinct sample signal and modify the phase of the distinct sample signal to produce a distinct modified sample signal when in the transmit mode, wherein each transmit branch and each receive branch is coupled to an element of the plurality of elements;

a summing system that combines a plurality of the distinct modified sample signals from the receive branches into a combined output signal copy that mimics an actual far field transmit output signal of the beamforming system; and a sample controller configured to control which of the plurality of transmit/receive channels are combined to form the combined output signal copy.

8. The beamforming system as defined by claim 7, further comprising a processor configured to process a sum of a plurality of combined output signal copies.

9. The beamforming system as defined by claim 8, wherein the processor is configured to adjust at least one beamforming system function based on the processing of the sum of the combined output signal copies.

10. The beamforming system as defined by claim 7, further comprising at least one substrate supporting the at least one IC, wherein at least a portion of the summing system is formed by the at least one substrate.

11. The beamforming system as defined by claim 10, wherein the at least one substrate comprises a printed circuit board having a plurality of conductive layers, and wherein the plurality of conductive layers comprises the portion of the summing system.

12. The beamforming system as defined by claim 7, wherein the at least one IC comprises a plurality of ICs producing a plurality of combined IC output signal copies, and wherein the summing system combines a plurality of the combined IC output signal copies into the combined output signal copy.

13. The beamforming system as defined by claim 7, wherein at least one sampling circuit of at least one IC comprises an electrical coupling having a passive circuit element, and wherein the electrical coupling is configured to passively sample the output transmit signal with the passive circuit element.

14. The beamforming system as defined by claim 7, further comprising a digital pre-distorter configured to receive a modified sample signal associated with a given transmit branch and to pre-distort the output transmit signal of the given transmit branch as a function of the received modified sample signal.

15. A beamforming method that enables local monitoring of far field output transmit signals, the beamforming method comprising:

providing at least one IC having a transmit mode in which the IC is actively transmitting to the far field and is not actively processing receive signals from the far field and a receive mode in which the IC is actively processing receive signals from the far field, the IC comprising a plurality of transmit/receive channels, each transmit/receive channel comprising a transmit branch configured to produce an output transmit signal for far field transmission when in the transmit mode, a sampling circuit configured to sample the output transmit signal to produce a distinct sample signal, and a receive branch configured (a) to receive a far field input signal when in the receive mode and (b) to receive the distinct sample signal and modify the phase of the distinct sample signal to produce a distinct modified sample signal when in the transmit mode;

placing the at least one IC in the transmit mode; and combining a plurality of the distinct modified sample signals from the receive branches into a combined output signal copy that mimics an actual far field transmit output signal of the beamforming system, wherein the at least one IC comprises a plurality of ICs producing a plurality of combined IC output signal copies, and wherein combining the plurality of distinct modified sample signals comprises combining the combined IC output signal copies into the combined output signal copy.

16. The beamforming method as defined by claim 15, further comprising processing the sum of the plurality of combined output signal copies and adjusting at least one beamforming system function based on the processing of the sum of the combined output signal copies.

17. The beamforming method as defined by claim 15, further comprising receiving a modified sample signal associated with a given transmit branch and pre-distorting the output transmit signal of the given transmit branch as a function of the received modified sample signal.

18. A beamforming system that enables local monitoring of far field output transmit signals, the beamforming system comprising:

a plurality of elements for transmission and reception of far field signals;

at least one IC having a transmit mode in which the IC is actively transmitting to the far field and is not actively processing receive signals from the far field and a receive mode in which the IC is actively processing receive signals from the far field, the IC comprising a plurality of transmit/receive channels, each transmit/receive channel comprising a transmit branch configured to produce an output transmit signal for far field transmission when in the transmit mode, a sampling circuit configured to sample the output transmit signal to produce a distinct sample signal, and a receive branch configured (a) to receive a far field input signal when in the receive mode and (b) to receive the distinct sample signal and modify the phase of the distinct sample signal to produce a distinct modified sample signal when in the transmit mode, wherein each transmit branch and each receive branch is coupled to an element of the plurality of elements; and a summing system that combines a plurality of the distinct modified sample signals from the receive branches into a combined output signal copy that mimics an actual far field transmit output signal of the beamforming system, wherein the at least one IC comprises a plurality of ICs producing a plurality of combined IC output signal copies, and wherein the summing system combines a plurality of the combined IC output signal copies into the combined output signal copy.

19. The beamforming system as defined by claim 18, wherein at least one sampling circuit of at least one IC comprises an electrical coupling having a passive circuit element, and wherein the electrical coupling is configured to passively sample the output transmit signal with the passive circuit element.

20. The beamforming system as defined by claim 18, further comprising a processor configured to sum a plurality of combined output signal copies and adjust at least one beamforming system function based on the sum of the combined output signal copies.

* * * * *